(12) United States Patent
Park

(10) Patent No.: US 7,927,506 B2
(45) Date of Patent: Apr. 19, 2011

(54) CATHODE ACTIVE MATERIAL AND LITHIUM BATTERY USING THE SAME

(75) Inventor: Kyu-sung Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 699 days.

(21) Appl. No.: 11/859,700

(22) Filed: Sep. 21, 2007

(65) Prior Publication Data

US 2008/0083901 A1 Apr. 10, 2008

(30) Foreign Application Priority Data

Oct. 4, 2006 (KR) .................. 10-2006-0097665
Sep. 13, 2007 (KR) .................. 10-2007-0093258

(51) Int. Cl.
*H01M 4/48* (2010.01)
*H01M 4/50* (2010.01)
*H01M 4/52* (2010.01)

(52) U.S. Cl. ........... 252/182.1; 252/500; 429/220; 429/223; 429/224; 429/231.1; 429/231.2; 423/599; 423/593.1; 423/594.2

(58) Field of Classification Search ........... 429/218.1, 429/223, 224, 231, 231.95, 231.3, 231.5; 423/594.5, 599; 252/500, 182.1, 518.1, 520.2, 252/519.1

See application file for complete search history.

(56) References Cited

U.S. PATENT DOCUMENTS

| 5,240,794 A * | 8/1993 | Thackeray et al. ........... 429/224 |
| 2003/0035999 A1 * | 2/2003 | Gao et al. .................... 429/231.1 |
| 2003/0180616 A1 * | 9/2003 | Johnson et al. ............ 429/231.1 |
| 2005/0026040 A1 * | 2/2005 | Thackeray et al. ......... 429/231.1 |
| 2006/0051671 A1 * | 3/2006 | Thackeray et al. .......... 429/224 |
| 2006/0051673 A1 * | 3/2006 | Johnson et al. ............... 429/224 |
| 2009/0224212 A1 * | 9/2009 | Manthiram et al. .......... 252/503 |

OTHER PUBLICATIONS

Hong et al, "Structural and electrochemical properties of (1-x)Li[Ni0.20Mn0.60]O2-xLi[Co0.50Li0.167MnO0.333]O2 for lithium secondary batteries," J. Power Sources, 2005,147,214-219.*
Jin et al, "Structural and electrochemical characterization of Li[CoNi1/2Mn1/2).x(Li1/3Mn2/3)(1-2x)]O2 solid solutions with layered lithium manganese oxides," J. Power Sources, 2005, 146, 630-635.*
Johnson et al, Lithium-manganese oxide electrode with layered-spinel composite structures xLi2MnO3. (1-x)Li1+yMn2-yO4 (0<x<1, 0<=y<=0.33) for lithium batteries, Electrochem. Commun. 2005, 7, 528-536.*

(Continued)

*Primary Examiner* — Stanley Silverman
*Assistant Examiner* — Kallambella Vijayakumar
(74) *Attorney, Agent, or Firm* — Christie, Parker & Hale, LLP

(57) ABSTRACT

Cathode active materials including lithium composite metal oxides having layered-spine composite structures are provided. The lithium metal oxide may be represented by the formula $xLi_2MO_3-yLiMeO_2-zLi_{1+d}M'_{2-d}O_4$, in which $0 \leq d \leq 0.33$, $0<x<1$, $0<y<1$, $0<z<1$ and $x+y+z=1$. In the formula M is selected from Mn, Ti, Zn, and combinations thereof. Me is selected from Ti, V, Cr, Mn, Fe, Co, Ni, Cu, Al, Mg, Zr, B and combinations thereof. M' is selected from Ti, V, Cr, Mn, Fe, Co, Ni, Cu, Al, Mg, Zr, B, and combinations thereof. The cathode active materials have layered-spinel composite structures in which lithium can be intercalated and deintercalated. Lithium batteries including the cathode active materials show high initial coulombic efficiencies and high capacity retention ratios.

17 Claims, 7 Drawing Sheets

OTHER PUBLICATIONS

Thackeray, M.M., et al., *Comments on the structural complexity of lithium-rich $Li_{1+x}M_{1-x}O_2$ electrodes (M=Mn, Ni, co) for lithium batteries*, Electrochemistry Communications, vol. 8, (2006), pp. 1531-1538, XP 005638334.

Thackeray, M.M., et al., *Advances in manganese-oxide 'composite' electrodes for lithium-ion batteries*, Journal of Materials Chemistry, vol. 15, (2005), pp. 2257-2267, XP 007903619.

Park, S-H., et al., *Lithium-manganese-nickel-oxide electrodes with integrated layered-spinel structures for lithium batteries*, Electrochemistry Communications, vol. 9, (2007), pp. 262-268, XP 005878764.

European Search Report dated Jan. 31, 2008, for European application 07116997.3, indicating relevance of listed references in this IDS.

SIPO Office action dated Oct. 8, 2010, for corresponding Chinese Patent application 200710149947.9 with English translation, citing U.S. Publication 2006/0051671, previously cited in U.S. Office action dated Apr. 8, 2010 in this application.

* cited by examiner

CATHODE ACTIVE MATERIAL AND LITHIUM BATTERY USING THE SAME

CROSS-REFERENCE TO RELATED APPLICATION

This application claims priority to and the benefit of Korean Patent Application No. 10-2006-0097665, filed on Oct. 4, 2006 in the Korean Intellectual Property Office and Korean Patent Application No. 10-2007-0093258, filed on Sep. 13, 2007 in the Korean Intellectual Property Office.

BACKGROUND OF THE INVENTION

1. Field of the Invention

The present invention relates to cathode active materials and lithium batteries using the same.

2. Description of the Related Art

In general, cathode active materials used in lithium batteries contain transition metal compounds or oxides thereof and lithium, such as $LiNiO_2$, $LiCoO_2$, $LiMn_2O_4$, $LiFePO_4$, $LiNi_xCo_{1-x}O_2$ where $0 \leq x \leq 1$, or $LiNi_{1-x-y}Co_xMn_yO_2$ where $0 \leq x \leq 0.5$ and $0 \leq y \leq 0.5$.

Among these cathode active materials, $LiCoO_2$ is typically used in lithium batteries. However, $LiCoO_2$ is relatively expensive and has a limited discharge capacity of about 140 mAh/g. In addition, when the lithium battery is in a charged state, Li is removed from $LiCoO_2$ so that $LiCoO_2$ turns into $Li_{1-x}CoO_2$, which is inherently unstable and unreliable.

To address these problems, improved cathode active materials, such as $LiNi_xCo_{1-x}O_2$ where $x=1$ or 2 and $LiNi_{1-x-y}Co_xMn_yO_2$ where $0 \leq x \leq 0.5$ and $0 \leq y \leq 0.5$ have been proposed. However, these cathode active materials do not entirely overcome the above described problems.

In consideration of electrochemical potential, cost, discharge capacity, stability, and toxicity of metal oxides, Mn is the most suitable first row transition metal atom for replacing Co in a cathode of a lithium battery. In addition, Mn oxides and Li—Mn oxides can have various structures such as one-dimensional structures, two-dimensional layer structures, and three-dimensional framework structures. Examples of such structures include alpha-$MnO_2$, beta-$MnO_2$, and gamma-$MnO_2$. In general, even when lithium is intercalated or deintercalated, the structural integrity of these Mn oxides is not destroyed.

Accordingly, Mn oxides having many structures have been proposed as new cathode materials. In particular, in line with the demand for high-capacity batteries, a composite oxide has been suggested as an alternative. An example of such a composite oxide is a layered structure of $xLi_2MO_3$—$(1-x)LiMeO_2$, where $0 \leq x \leq 1$ and M and Me can be Mn. However, although such composite oxides having layered structures have high initial discharge capacities, they also have high irreversible capacities. That is, during initial charging, the Mn in the $Li_2MO_3$ of the composite oxide has an oxidation number of 4+ as shown in the reaction scheme described below. This means that Mn is not additionally oxidized, and thus that oxygen is decomposed together with lithium into $Li_2O$. Then, during discharging, only lithium enters the composite oxide since the decomposed oxygen cannot reversibly enter the composition, and Mn is reduced to 3+. Accordingly, the initial charge/discharge efficiency of $Li_2MO_3$ is maintained at 50%.

(charging) $Li_2Mn^{4+}O_3 \rightarrow Li_2O + Mn^{4+}O_2$ (discharging) $Mn^{4+}O_2 + Li \rightarrow LiMn^{3+}O_2$ To obtain high discharge capacity, the content ratio of $Li_2MO_3$ can be increased to 50% or more. In this case, however, initial irreversible capacity is also increased.

SUMMARY OF THE INVENTION

In one embodiment of the present invention, a cathode active material prevents decreases in irreversible capacity upon initial charging.

In another embodiment of the present invention, a cathode includes the cathode active material.

In yet another embodiment of the present invention, a lithium battery includes the cathode.

According to an embodiment of the present invention, a cathode active material includes a layered-spinel composite structure lithium metal oxide represented by Formula 1.

$$xLi_2MO_3\text{-}yLiMeO_2\text{-}zLi_{1+d}M'_{2-d}O_4 \qquad (1)$$

In Formula 1, $0 \leq d \leq 0.33$, $0<x<1$, $0<y<1$, $0<z<1$ and $x+y+z=1$. M is selected from Mn, Ti, and combinations thereof. Me is selected from Ti, V, Cr, Mn, Fe, Co, Ni, Cu, Al, Mg, Zr, B and combinations thereof. M' is selected from Ti, V, Cr, Mn, Fe, Co, Ni, Cu, Al, Mg, Zr, B and combinations thereof.

According to another embodiment of the present invention, a cathode includes the cathode active material.

According to yet another embodiment of the present invention, a lithium battery includes the cathode.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Conventional cathode active materials have layered structures such that lithium batteries including the conventional cathode active materials have high initial irreversible capacities and therefore low initial charge/discharge efficiencies. In contrast, according to one embodiment of the present invention, a cathode active material has a layered-spinel composite structure in which lithium can be intercalated and deintercalated so that lithium batteries including the cathode active material have high initial coulombic efficiencies and high capacity retention ratios.

The cathode active material according to one embodiment of the present invention includes a lithium metal oxide having a layered-spinel composite structure represented by Formula 1.

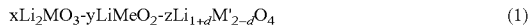

$$xLi_2MO_3\text{-}yLiMeO_2\text{-}zLi_{1+d}M'_{2-d}O_4 \quad (1)$$

In Formula 1, $0 \leq d \leq 0.33$, $0<x<1$, $0<y<1$, $0<z<1$ and $x+y+z=1$. M is selected from Mn, Ti, and combinations thereof. Me is selected from Ti, V, Cr, Mn, Fe, Co, Ni, Cu, Al, Mg, Zr, B and combinations thereof. M' is selected from Ti, V, Cr, Mn, Fe, Co, Ni, Cu, Al, Mg, Zr, B and combinations thereof.

The lithium metal oxide represented by Formula 1 may have a layered-spinel composite structure. More specifically, in the lithium metal oxide, $Li_{1+d}M'_{2-d}O_4$ may have a spinel structure and $Li_2MO_3$–$LiMeO_2$ may have a layered structure.

Due to the presence of the spinel structure, lithium which has been deintercalated from the cathode active material can be intercalated in the cathode active material. For example, when $LiMn_2O_4$ in the lithium metal oxide has a spinel structure, the Mn ion is repeatedly oxidized/reduced to Mn3+/4+ so that lithium can be intercalated or deintercalated in the lithium metal oxide. Therefore, lithium can be additionally intercalated in the lithium metal oxide, which does not occur in the $Li_2MO_3$—$LiMeO_2$ composite structure. Accordingly, lithium batteries including the inventive cathode active material have increased discharge capacities and increased charge/discharge efficiencies.

Figure 1:
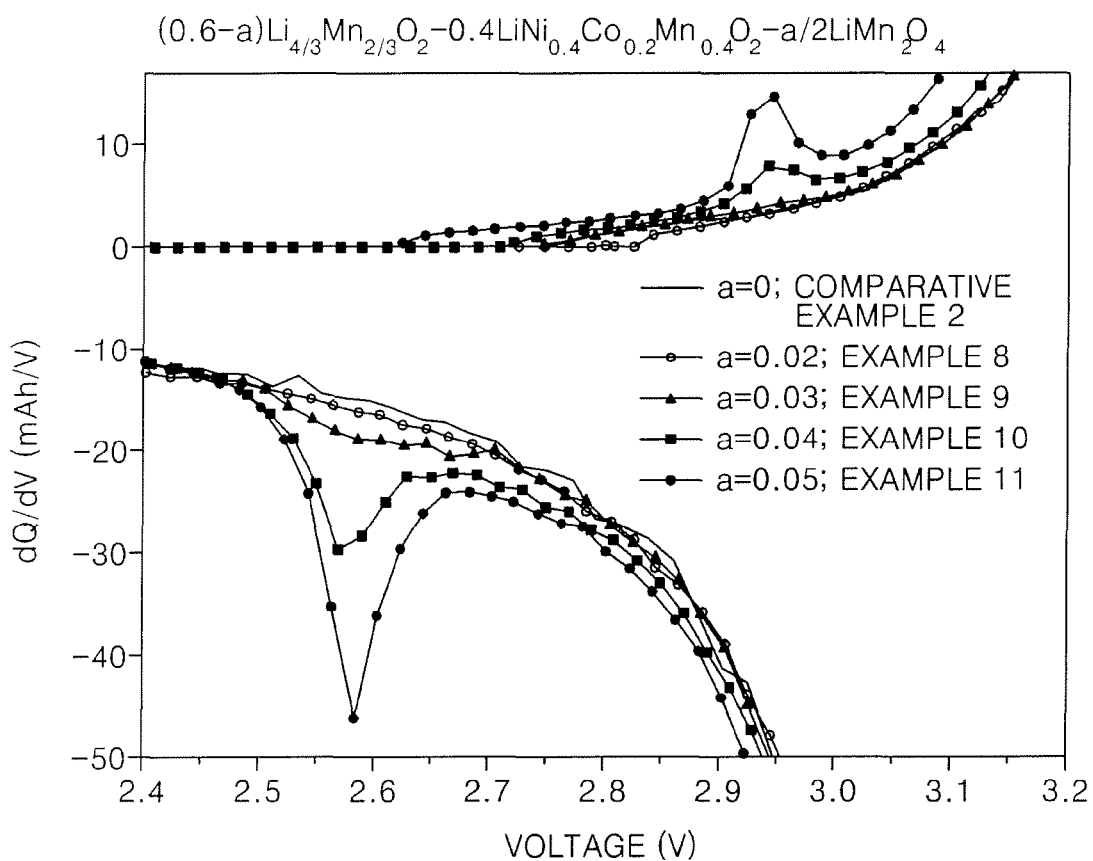
FIG. 1 is a graph comparing the charge/discharge properties of lithium batteries prepared according to Comparative Example 2 and Examples 8 through 11.

Charge/discharge experiments were performed using a lithium metal oxide having a spinel structure as a cathode active material and lithium metal as the counter electrode. The results are shown in FIG. 1 and reported as charge/discharge capacities with respect to voltage. FIG. 1 is a graph comparing the charge/discharge properties of lithium batteries prepared according to the below Examples and Comparative Example. Referring to FIG. 1, oxidation and reduction occur in a specific voltage range, which indicates the presence of the spinel structure in which Mn ions can be oxidized and reduced.

In one embodiment of the lithium metal oxide represented by Formula 1, $0<x<0.7$. When $0<x<0.7$, the content ratio of $Li_2MO_3$ (which has more lithium than $LiMeO_2$ or $Li_{1+d}M'_{2-d}O_4$) increases, thus increasing charge/discharge capacity.

In one embodiment of the lithium metal oxide represented by Formula 1, $0.3<y<1$. When $0.3<y<1$, good electric conductivity can be obtained and increased charge/discharge capacity can be obtained from $Li_2MO_3$.

In one embodiment of the lithium metal oxide represented by Formula 1, $0<z<0.3$. When $0<z<0.3$, high charge/discharge efficiency can be obtained.

According to another embodiment, the cathode active material of Formula 1 can be represented by Formula 2.

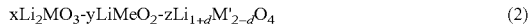

$$xLi_2MO_3\text{-}yLiMeO_2\text{-}zLi_{1+d}M'_{2-d}O_4 \quad (2)$$

In Formula 2, $0 \leq d \leq 0.33$, $0<x<0.7$, $0.3<y<1$, $0<z<0.3$, and $x+y+z=1$. Each of M and M' is Mn. Me is selected from Ti, V, Cr, Mn, Fe, Co, Ni, Cu, Al, Mg, Zr, B and combinations thereof.

The lithium metal oxide represented by Formula 2 has a layered-spinel composite structure, and in particular, $LiMn_2O_4$ may have a spinel structure.

According to yet another embodiment, the cathode active material of Formula 1 can be represented by Formula 3.

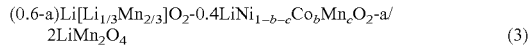

$$(0.6\text{-}a)Li[Li_{1/3}Mn_{2/3}]O_2\text{-}0.4LiNi_{1-b-c}Co_bMn_cO_2\text{-}a/2LiMn_2O_4 \quad (3)$$

In Formula 3, $0<a<0.6$, $0<b<0.5$, and $0<c<0.5$.

The lithium metal oxide represented by Formula 3 may have a layered-spinel composite structure, and in particular, $LiMn_2O_4$ may have a spinel structure.

In a graph illustrating results of a charge/discharge test on a half cell which includes the lithium metal oxide represented by Formula 1 acting as a cathode and lithium metal acting as a counter electrode wherein the x-axis represents voltage with respect to lithium metal and the y-axis represents a value of charge/discharge capacity differentiated by the voltage, when the half cell is charged or discharged, the lithium metal oxide represented by Formula 1 shows oxidation and reduction peaks of Mn existing in the spinel structure in the range from 2.0 V to 3.0 V with respect to the lithium metal.

FIG. 1 is a graph illustrating the results of charge/discharge tests performed on half cells including lithium metal oxides represented by Formula 1 as the cathodes and lithium metal as the counter electrodes. In the graph, the x-axis represents the voltage with respect to lithium metal, and the y-axis represents the charge/discharge capacity with respect to the voltage. When the half-cells are charged, oxidation peaks of Mn existing in the spinel structure appear in a range of 2.9V to 3.0V. When the half-cell is discharged, reduction peaks of Mn existing in the spinel structure appear in a range of 2.5V to 2.7V.

A cathode according to an embodiment of the present invention includes an above described cathode active material. A method of producing such a cathode according to one embodiment of the present invention will now be described.

First, an above described cathode active material, a conducting agent, a binder, and a solvent are mixed to prepare a cathode active material composition. The cathode active material composition can be coated directly on an aluminum collector and dried to prepare a cathode plate. Alternatively, the cathode active material composition can be cast on a separate support to form a cathode active material film, which film is then peeled from the separate support and laminated on an aluminum collector to prepare a cathode plate.

One nonlimiting example of a suitable conducting agent is carbon black. Nonlimiting examples of suitable binders include vinylidene fluoride/hexafluoropropylene copolymers, polyvinylidenefluoride, polyacrylonitrile, polymethylmethacrylate, polytetrafluoroethylene, and mixtures thereof. The binder may also be a styrene butadiene rubber-based polymer. Nonlimiting examples of suitable solvents include N-methylpyrrolidone (NMP), acetone, water, and the like. The amounts of the cathode active material, the conducting agent, the binder, and the solvent are the same as those used in conventional lithium batteries.

A lithium battery according to an embodiment of the present invention includes an above described cathode. A method of producing a lithium battery including an above described cathode according to one embodiment of the present invention will now be described.

First, a cathode including an above described cathode active material is prepared.

Then, using the same method as that used to prepare the cathode, an anode active material, a conducting agent, a binder, and a solvent are mixed to prepare an anode active material composition. The anode active material composition can be coated directly on a copper collector to obtain an anode plate. Alternatively, the anode active material composition can be cast on a separate support to form an anode active material film, which film is then peeled from the separate support and laminated on a copper collector to obtain an anode plate. The amounts of the anode active material, the conducting agent, the binder, and the solvent are the same as in conventional lithium batteries.

Nonlimiting examples of suitable anode active materials include lithium metal, lithium alloys, and carbonaceous materials (such as graphite). In the anode active material composition, the conducting agent, the binder, and the solvent can be the same as used in the cathode. In some cases, a plasticizer can be added to the cathode active material composition and the anode active material composition to form pores in the electrode plates.

The cathode and the anode can be separated by a separator. The separator can be any separator that is commonly used in lithium batteries. A suitable separator may have low resistance to ion movement of the electrolyte and high electrolyte retaining capability. Nonlimiting examples of suitable separators include glass fibers, polyester, teflon, polyethylene, polypropylene, polytetrafluoroethylene (PTFE) and combinations thereof, each of which can be a woven or non-woven fabric. Foldable separators formed of polyethylene or polypropylene can be used in lithium ion batteries. On the other hand, separators having high organic electrolyte retaining capabilities can be used in lithium ion polymer batteries. A method of preparing a separator will now be described.

A polymer resin, a filler, and a solvent are mixed to prepare a separator composition. The separator composition can be coated directly on an electrode and dried to form a separator film. Alternatively, the separator composition can be cast on a support and dried to form a separator composition film, which film is then peeled from the separate support and laminated on an electrode.

The polymer resin is not limited and can be any material used as a binder for an electrode plate. Nonlimiting examples of suitable polymer resins include vinylidenefluoride/hexafluoropropylene copolymers, polyvinylidenefluoride, polyacrylonitrile, polymethylmethacrylate, and mixtures thereof. According to one embodiment, a suitable polymer resin is a vinylidenefluoride/hexafluoropropylene copolymer containing from about 8 to about 25 wt % of hexafluoropropylene.

Figure 6:
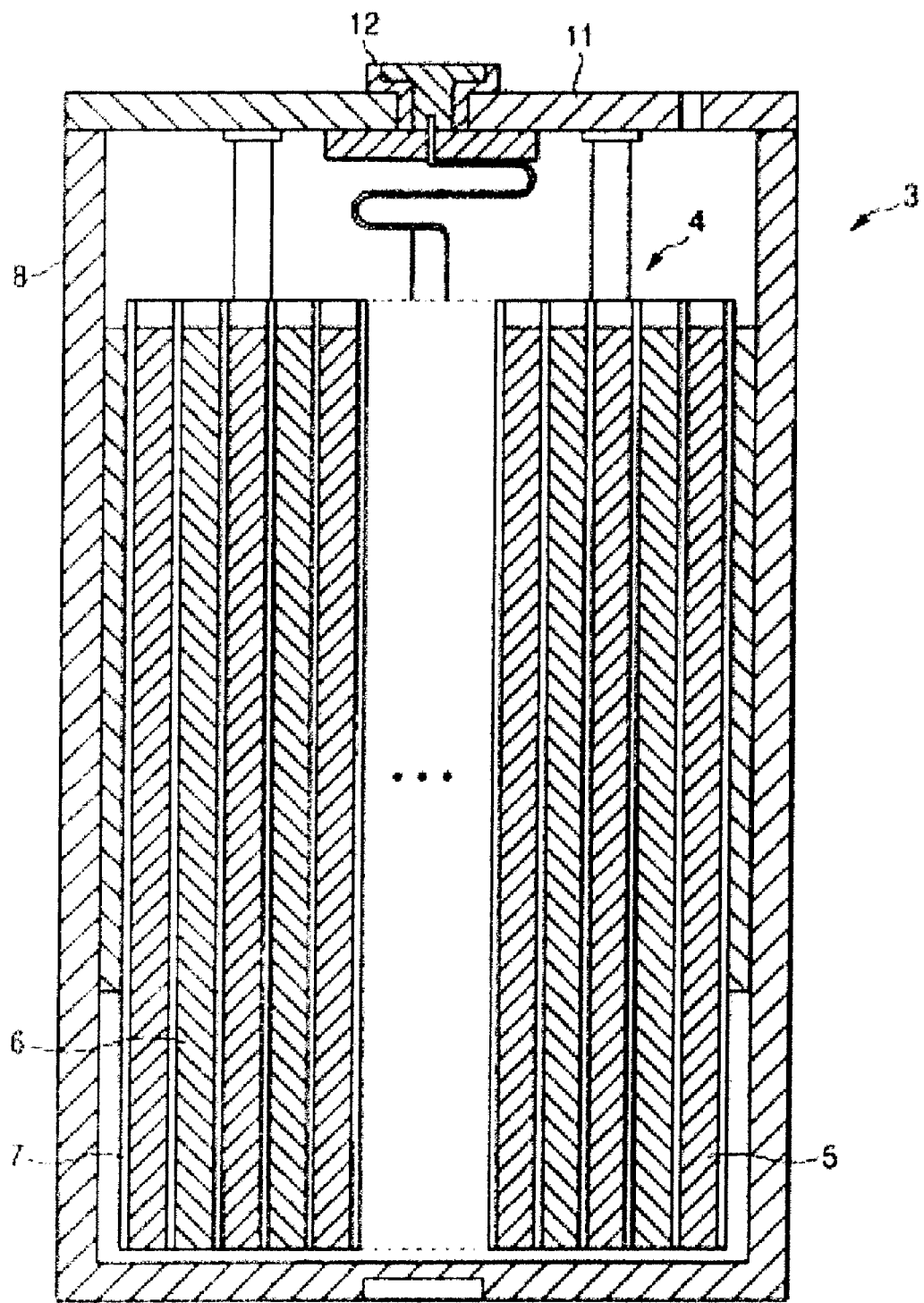
FIG. 6 is a cross-sectional view of a lithium battery according to one embodiment of the present invention.
Figure 3:
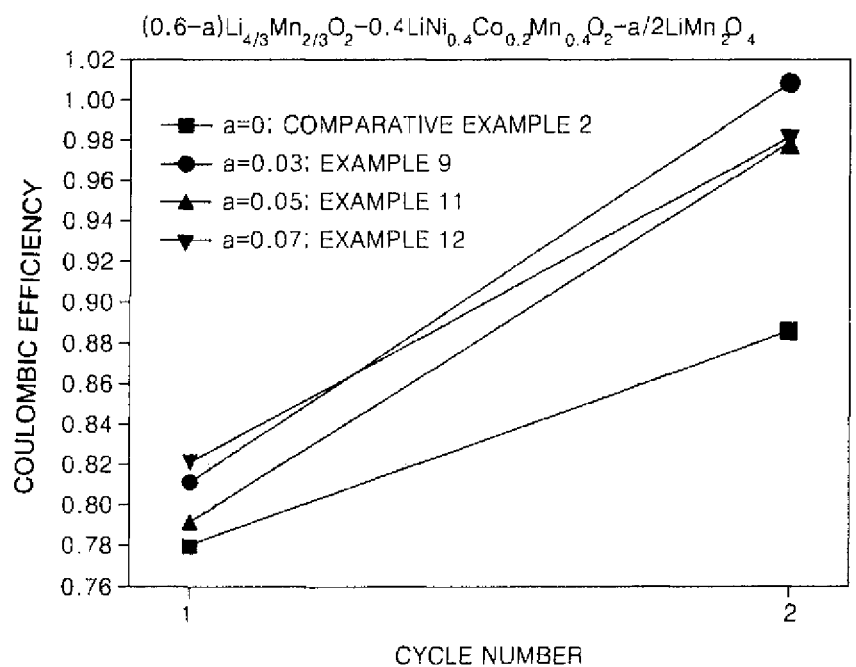
Figure 3:
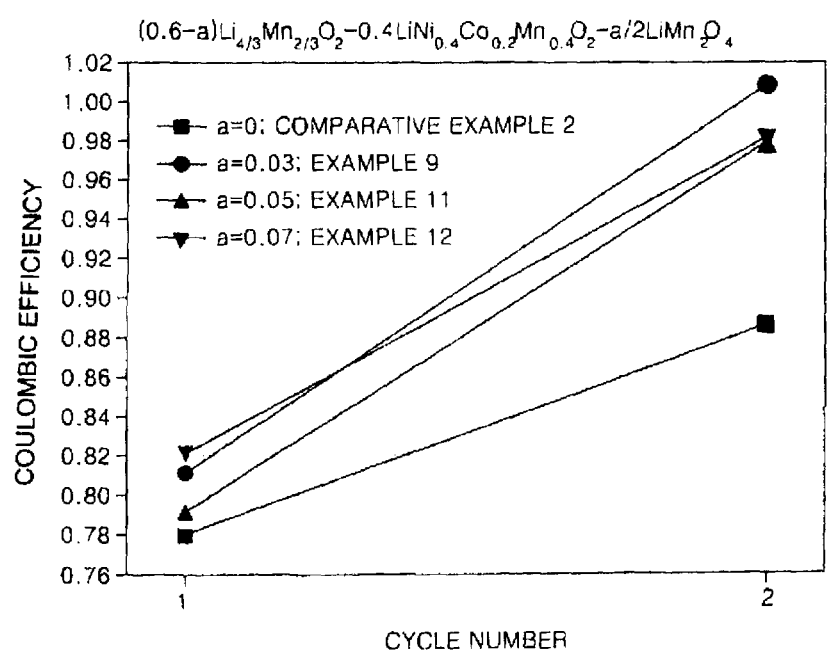

As shown in FIG. 6, a lithium battery 3 according to one embodiment of the present invention includes and electrode assembly 4 which includes a cathode 5, anode 6 and a separator 7 between the cathode 5 and anode 6. The electrode assembly 4 is enclosed in a battery case 8, which is sealed with a cap plate 11 and gasket 12. An organic electrolyte is then injected into the battery to complete a lithium ion battery.

Alternatively, the battery assembly can be stacked to form a bi-cell structure, and then impregnated with an organic electrolyte. The obtained product is then placed in a pouch and sealed, thus completing a lithium ion polymer battery.

The organic electrolyte used in these lithium batteries can include a lithium salt and a mixed organic solvent including a high permittivity solvent and a low boiling point solvent.

The high permittivity solvent can be any solvent used in the art. Nonlimiting examples of suitable high permittivity solvents include cyclic carbonates (such as ethylene carbonate, propylene carbonate, and butylene carbonate), and gamma-butyrolactone.

The low boiling point solvent can be any solvent used in the art. Nonlimiting examples of suitable low boiling point solvents include linear carbonates (such as dimethyl carbonate, ethylmethyl carbonate, diethyl carbonate, and dipropyl carbonate), dimethoxyethane, diethoxyethane, and fatty acid ester derivatives.

The high permittivity solvent and the low boiling point solvent may be mixed in a volume ratio ranging from about 1:1 to about 1:9. When the volume ratio is outside this range, desired discharge capacities and charge/discharge lifetimes are difficult to obtain.

The lithium salt can be any lithium salt used in conventional lithium batteries. Nonlimiting examples of suitable lithium salts include $LiClO_4$, $LiCF_3SO_3$, $LiPF_6$, $LiN(CF_3SO_2)_2$, $LiBF_4$, $LiC(CF_3SO_2)_3$, $LiN(C_2F_5SO_2)_2$ and combinations thereof.

In the organic electrolyte, the concentration of the lithium salt may range from about 0.5 to about 2M. When the concentration of the lithium salt is less than about 0.5M, the conductivity of the organic electrolyte decreases, thus degrading the performance of the organic electrolyte. On the other hand, when the concentration of the lithium salt is greater than about 2.0M, the viscosity of the organic electrolyte increase, thus slowing the movement of lithium ions.

The present invention will now be described with reference to the following Examples. These Examples are presented for illustrative purposes only and are not intended to limit the scope of the present invention.

EXAMPLE 1

Synthesis of Active Material Represented by (0.6-a)Li[Li$_{1/3}$Mn$_{2/3}$]O$_2$-0.4LiNi$_{0.4}$Co$_{0.2}$Mn$_{0.4}$O$_2$-a/2LiMn$_2$O$_4$, where a=0.02

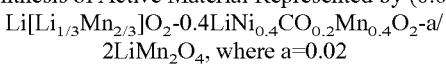

Lithium carbonate, nickel acetate, cobalt acetate, and manganese acetate were used as starting materials. The starting materials were prepared in amounts sufficient to maintain mole ratios of Li, Ni, Co, and Mn sufficient to obtain 0.04 mol of (0.6-a)Li[Li$_{1/3}$Mn$_{2/3}$]O$_2$-0.4LiNi$_{0.4}$Co$_{0.2}$Mn$_{0.4}$O$_2$-a/2LiMn$_2$O$_4$, where a=0.02. The starting materials were dissolved in 50 mL of an aqueous solution of diluted nitric acid, and then 50 mL of an aqueous citric acid solution and 30 mL of ethylene glycol were added thereto. The resultant sol was heated while being stirred on a hot plate to evaporate water. The combustion reaction of the obtained gel was performed on the hot plate. The gel was completely decomposed by combustion and then additional heat treatment was performed. The heat treatment was performed at 950° C. for five hours using dried air flow. The heat-treated product was naturally cooled in a furnace (hereinafter referred to as furnace cooling) to obtain 0.04 mol of the active material powder.

EXAMPLE 2

Synthesis of Active Material Represented by (0.6-a)Li[Li$_{1/3}$Mn$_{2/3}$]O$_2$-0.4LiNi$_{0.4}$Co$_{0.2}$Mn$_{0.4}$O$_2$-a/2LiMn$_2$O$_4$, where a=0.03

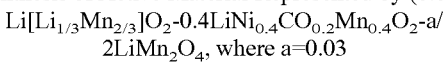

An active material powder was synthesized as in Example 1, except that the starting materials were prepared in amounts sufficient to maintain mole ratios of Li, Ni, Co, and Mn sufficient to obtain (0.6-a)Li[Li$_{1/3}$Mn$_{2/3}$]O$_2$-0.4LiNi$_{0.4}$Co$_{0.2}$Mn$_{0.4}$O$_2$-a/2LiMn$_2$O$_4$, where a=0.03.

EXAMPLE 3

Synthesis of Active Material Represented by (0.6-a)Li[Li$_{1/3}$Mn$_{2/3}$]O$_2$-0.4LiNi$_{0.4}$Co$_{0.2}$Mn$_{0.4}$O$_2$-a/2LiMn$_2$O$_4$, where a=0.04.

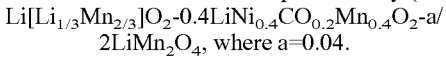

An active material powder was synthesized as in Example 1, except that the starting materials were prepared in amounts sufficient to maintain mole ratios of Li, Ni, Co, and Mn sufficient to obtain (0.6-a)Li[Li$_{1/3}$Mn$_{2/3}$]O$_2$-0.4LiNi$_{0.4}$Co$_{0.2}$Mn$_{0.4}$O$_2$-a/2LiMn$_2$O$_4$, where a=0.04.

EXAMPLE 4

Synthesis of Active Material Represented by $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2-a/2\text{LiMn}_2\text{O}_4$, where $a=0.05$ An active material powder was synthesized as in Example 1, except that the starting materials were prepared in amounts sufficient to maintain mole ratios of Li, Ni, Co, and Mn sufficient to obtain $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2-a/2\text{LiMn}_2\text{O}_4$, where $a=0.05$.

EXAMPLE 5

Synthesis of Active Material Represented by $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2-a/2\text{LiMn}_2\text{O}_4$, where $a=0.07$ An active material powder was synthesized as in Example 1, except that the starting materials were prepared in amounts sufficient to maintain mole ratios of Li, Ni, Co, and Mn sufficient to obtain $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2-a/2\text{LiMn}_2\text{O}_4$ where $a=0.07$.

EXAMPLE 6

Synthesis of Active Material Represented by $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2-a/2\text{LiMn}_2\text{O}_4$, where $a=0.1$ An active material powder was synthesized as in Example 1, except that the starting materials were prepared in amounts sufficient to maintain mole ratios of Li, Ni, Co, and Mn sufficient to obtain $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2-a/2\text{LiMn}_2\text{O}_4$, where $a=0.1$

EXAMPLE 7

Synthesis of $0.5\text{Li}[\text{Li}_{1/3}\text{Mn}_{2/3}]\text{O}_2-0.3\text{LiCoO}_2-0.2\text{Li}_{4/6}\text{Mn}_{5/6}\text{O}_2$ Active material powder was synthesized in the same manner as in Example 1, except that the mole ratio of starting materials of Li, Ni, Co, and Mn was controlled according to the compositional formula. Specifically, the decomposition was performed using a furnace, instead of a hot plate, at 400□, for 12 hours. The additional heat treatment was performed at 500□ for 10 hours while oxygen is provided.

Such decomposition using a furnace was required due to the fact that unlike $\text{LiMn}_2\text{O}_4$ used in Examples 1 through 6 which is an active material source and stable at high temperature, $\text{Li}_4\text{Mn}_5\text{O}_{12}$ used in the current experiment is unstable at high temperature, re.

EXAMPLE 8

Preparation of Lithium Half-Cell

The active material powder prepared according to Example 1 and a carbonaceous conducting agent (Ketjen Black; EC-600JD) were homogeneously mixed in a weight ratio of 93:3. A PVDF binder solution was then added thereto such that the weight ratio of active material to carbonaceous conducting agent to binder was 93:3:4.

The prepared slurry was coated on a 15□-thick aluminum foil and then dried to prepare a cathode plate. The cathode plate was vacuum dried and then used to produce a coin cell (CR2016 type). Lithium metal was used as the counter electrode, and 1.3M $\text{LiPF}_6$ in EC:DEC (3:7) was used as the electrolyte.

EXAMPLE 9

Preparation of Lithium Half-Cell

A lithium half-cell was produced as in Example 8, except that the active material powder prepared according to Example 2 was used.

EXAMPLE 10

Preparation of Lithium Half-Cell

A lithium half-cell was produced as in Example 8, except that the active material powder prepared according to Example 3 was used.

EXAMPLE 11

Preparation of Lithium Half-Cell

A lithium half-cell was produced as in Example 8, except that the active material powder prepared according to Example 4 was used.

EXAMPLE 12

Preparation of Lithium Half-Cell

A lithium half-cell was produced as in Example 8, except that the active material powder prepared according to Example 5 was used.

EXAMPLE 13

Preparation of Lithium Half-Cell

A lithium half-cell was produced as in Example 8, except that the active material powder prepared according to Example 6 was used.

EXAMPLE 14

Preparation of Lithium Half-Cell

A lithium half-cell was produced as in Example 8, except that the active material powder prepared according to Example 7 was used.

COMPARATIVE EXAMPLE 1

Synthesis of Active Material represented by $0.6\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2$ Lithium carbonate, nickel acetate, cobalt acetate, and manganese acetate were used as starting materials. The starting materials were prepared in amounts sufficient to obtain a mole ratio of Li, Ni, Co, and Mn sufficient to obtain 0.04 mol of $(0.6-a)\text{Li}[\text{Li}_{1/3}\text{Mn}_{2/3}]\text{O}_2-0.4\text{LiNi}_{0.4}\text{Co}_{0.2}\text{Mn}_{0.4}\text{O}_2$. Then, the starting materials were dissolved in 50 mL of an aqueous solution of diluted nitric acid, and then 50 mL of an aqueous citric acid solution and 30 mL of ethylene glycol were added thereto. The resultant sol was heated while being stirred on a hot plate to evaporate water. The combustion reaction of the obtained gel was performed on the hot plate. The gel was completely decomposed by combustion and then additional heat treatment was performed. The heat treatment was performed at 950☐ for five hours using dried air flow. The heat-treated product was subjected to furnace cooling to obtain 0.04 mol of the active material powder.

COMPARATIVE EXAMPLE 2

Preparation of Lithium Half-Cell

The active material powder prepared according to Comparative Example 1 and a carbonaceous conducting agent (Ketjen Black; EC-600JD) were homogeneously mixed in a weight ratio of 93:3. A PVDF binder solution was then added thereto such that the weight ratio of active material to carbonaceous conducting agent to binder was 93:3:4.

The prepared slurry was coated on a 15☐-thick aluminum foil and then dried to prepare a cathode plate. The cathode plate was vacuum dried and then used to produce a coin cell (CR2016 type). Lithium metal was used as the counter electrode, and 1.3M $LiPF_6$ in EC:DEC (3:7) was used as the electrolyte.

MEASUREMENT EXAMPLE 1

X-ray Diffraction Experiment

Figure 2A:
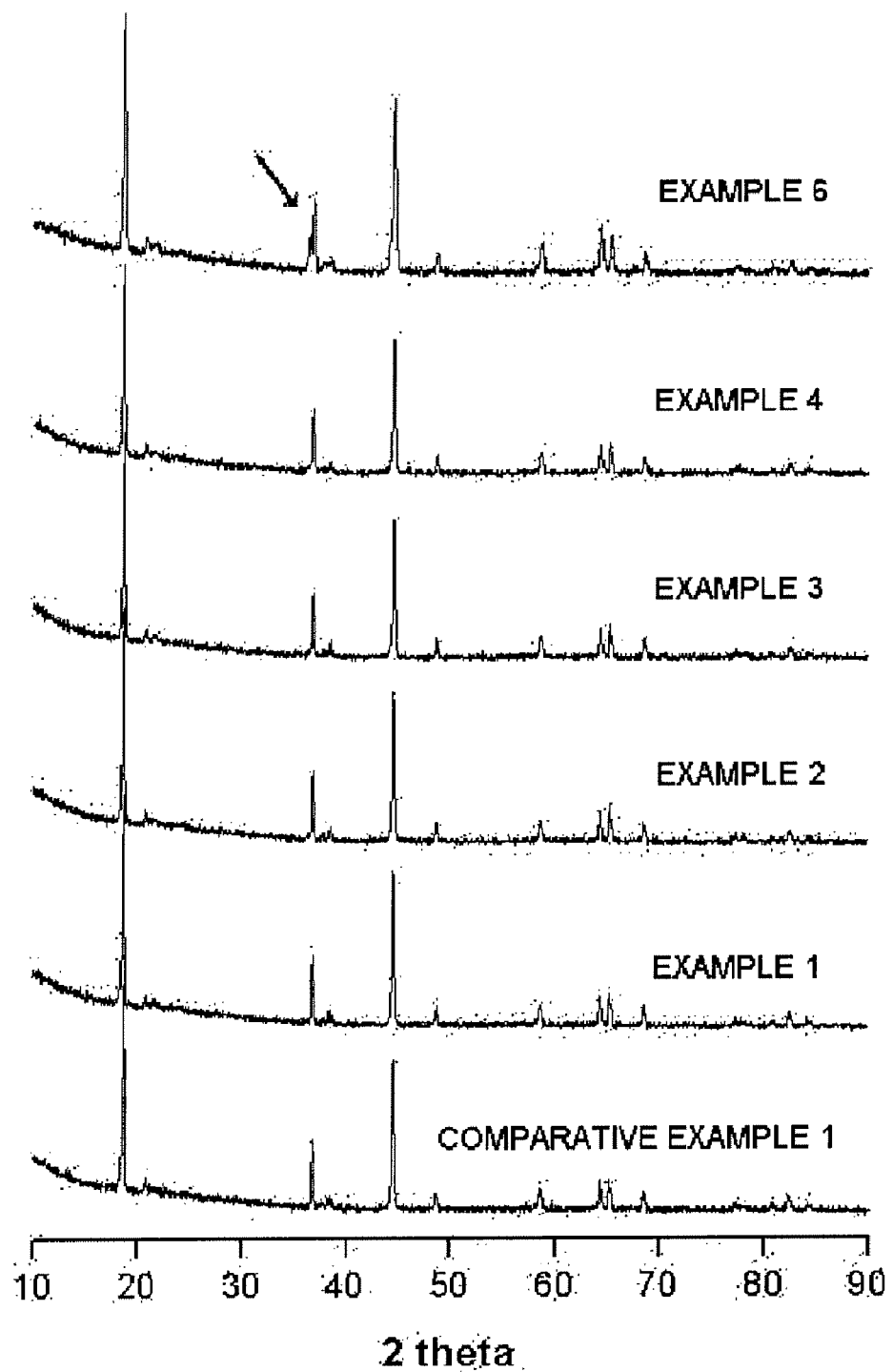
FIG. 2A is a graph comparing the X-ray diffraction results of active materials prepared according to Comparative Example 1 and Examples 1 through 4 and 6.
Figure 2B:
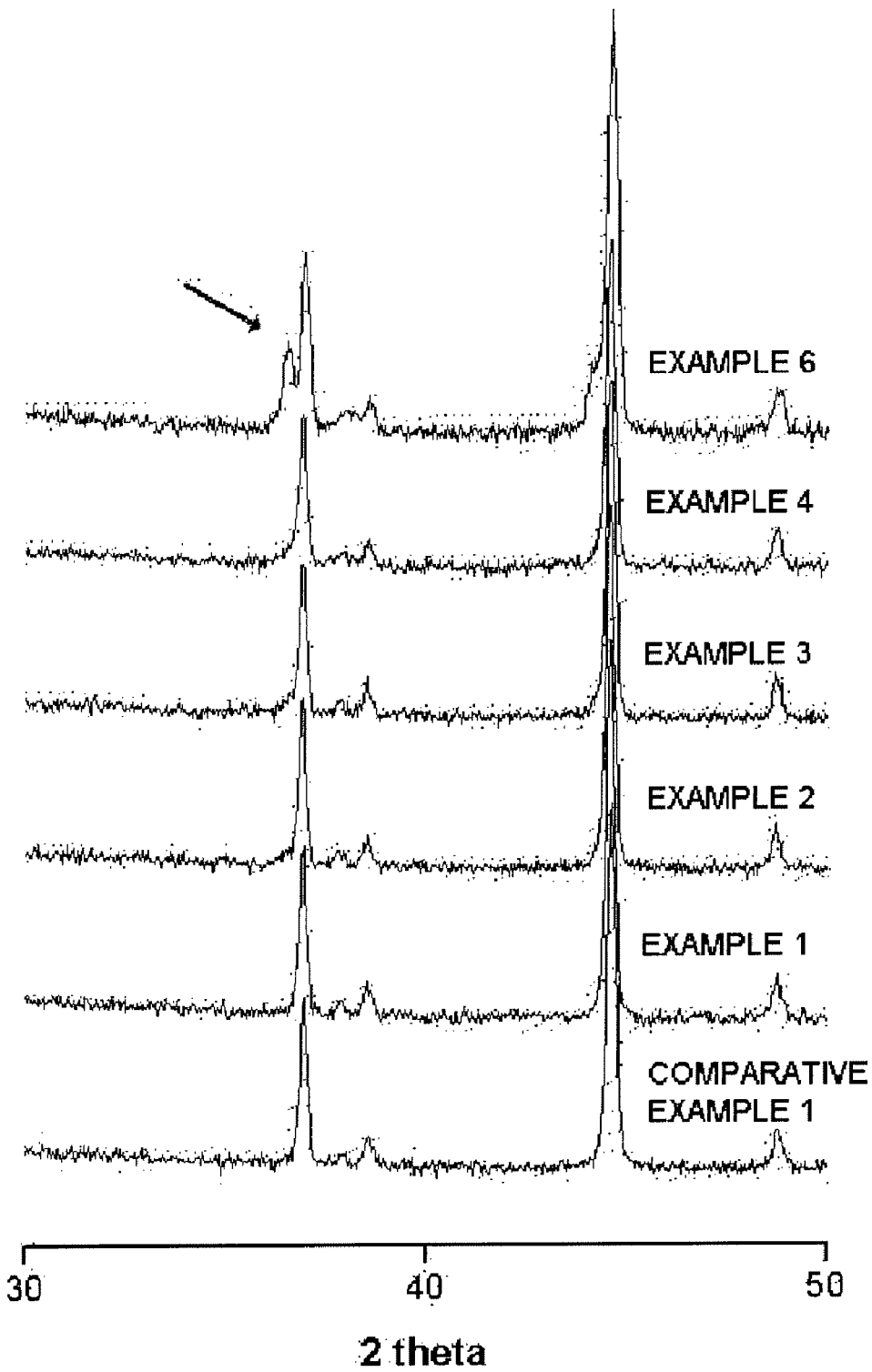
FIG. 2B is an enlarged view of the graph of FIG. 2A.

X-ray diffraction of each of the active materials prepared according to Examples 1 through 4 and 6, and Comparative Example 1 was measured to identify the respective structures. The results are shown in FIGS. 2A and 2B. FIG. 2B is an enlarged view of FIG. 2A.

Referring to FIGS. 2A and 2B, the arrow indicates a double peak of the spinel structure, which peak appears more clearly as the amount of $LiMn_2O_4$ (having the spinel structure) increases (from Comparative Example 1 (where a=0) to Example 6 (where a=0.1)). Absence of the double peak in Example 1 (where a=0.02) through Example 4 (a=0.05) may be due to the resolution limits of X-ray diffraction, and in fact, it is assumed that there is a double peak of the spinel structure in Example 1 (a=0.01) through Example 4 (a=0.05.)

MEASUREMENT EXAMPLE 2

Charge & Discharge Experiment

Charge/discharge experiments were performed on the lithium half-cells prepared according to Examples 8 through 14 and Comparative Example 2.

During charging, the lithium half-cells were charged to a voltage of 4.6V with a constant current of 20 mA/g. Then a constant voltage of 4.6V was applied to the charged half-cells until the current dropped to 2 mA/g. During discharging, the lithium half-cells were discharged with a constant current of 20 mA/g until the voltage dropped to 2V.

Some of these experimental results are shown in FIGS. 1, 3 through 5.

FIG. 1 is a graph comparing the charge/discharge capacities at cycle 3 of the cells prepared according to Examples 8 through 11 and Comparative Example 2. Referring to FIG. 1, oxidation and reduction peaks appear in a range of 2.4V to 3.2V. The oxidation and reduction peaks are more pronounced as the amount of $LiMn_2O_4$ (having a spinel structure) increases (from Comparative Example 2 (where a=0) to Example 11 (where a=0.05)), and appear at the same location (voltage). Such results stem from the presence of $Li_{1+d}Mn_{2-d}O_4$ (where $0 \leq d \leq 0.33$) and identify the presence of the spinel structure in the composite active material according to the present invention.

Figure 3:
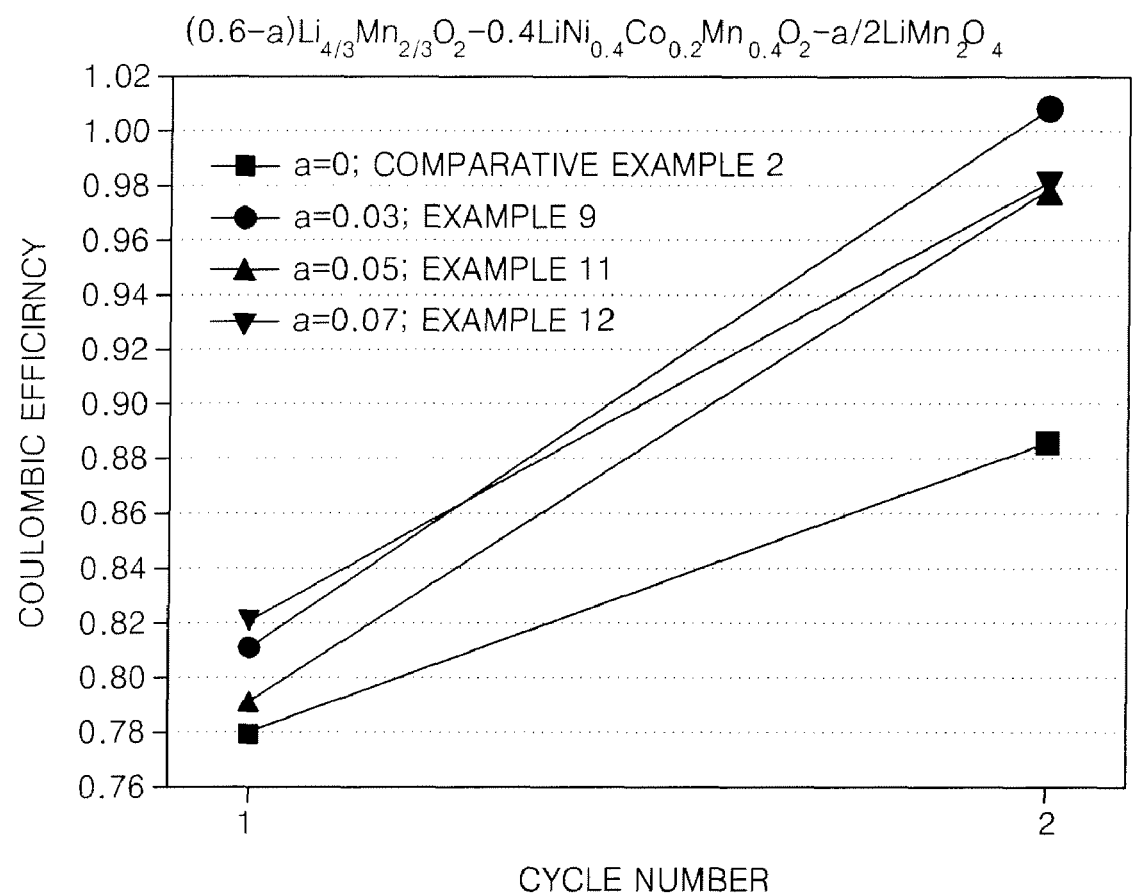
FIG. 3 is a graph comparing initial discharge capacities of lithium batteries prepared according to Comparative Example 2 and Examples 9, 11, and 12.

As shown, when the spinel structure is present, coulombic efficiency increases. For example, as shown in FIG. 3, when there is no spinel structure (as in Comparative Example 2(where a=0)), coulombic efficiency was about 88%, even at cycle 2. On the other hand, the coulombic efficiencies of the active materials used in Example 9 (where a=0.03), Example 11 (where a=0.05), and Example 12 (where a=0.07) were 98% or more.

The capacity retention rate of the half-cell prepared according to Comparative Example 2 was 69% of the initial capacity at cycle 2. In contrast, the capacity retention rates of the half-cells prepared according to Examples 8, 10 and 11 were 80% or more at cycle 2.

Figure 4:
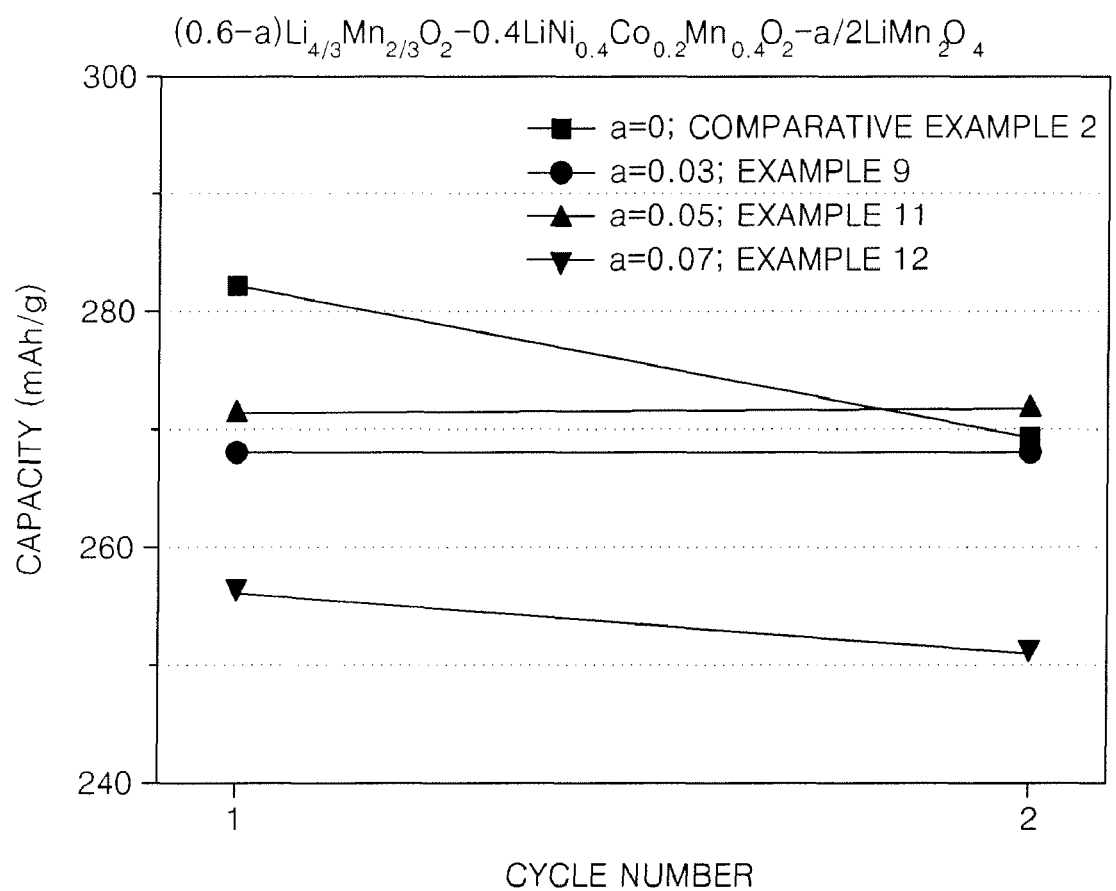
FIG. 4 is a graph comparing coulombic efficiency of lithium batteries prepared according to Comparative Example 2 and Examples 9, 11, and 12.

As for discharge capacity, by using a spinel structure having a lower discharge capacity than the $Li_2MnO_3$ phase, initial capacity decreased but coulombic efficiency increased. Thus, as illustrated in FIG. 4, the discharge capacity of the half-cell prepared according to Example 11 (a=0.05) at cycle 2 was greater than that of the half-cell prepared according to Comparative Example 2 (where a=0) at cycle 2.

Figure 5:
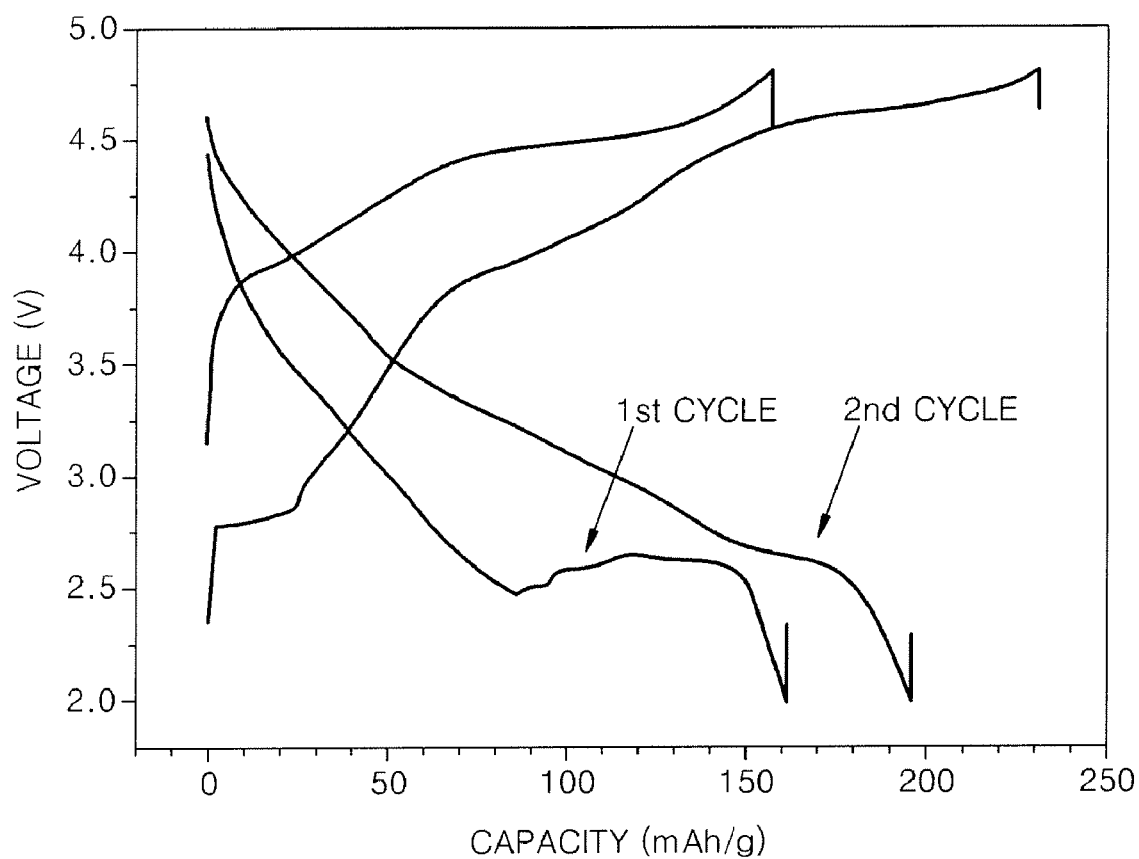
FIG. 5 illustrates a charge/discharge profile of the lithium battery prepared according to Example 14.

FIG. 5 shows a charging/discharging graph($1^{st}$ and $2^{nd}$ cycle) of Example 14 comprising $Li_4Mn_5O_{12}$ having low temperature spinel phase. In the FIG. 5, flat voltage region around 2.5V against lithium metal during charging/discharging shows the presence of the spinel structure. Also, in spite of the small quantity of the $Li_4Mn_5O_{12}$ having spinel structure, the cell shows good charging/discharging characteristics by representing an initial efficiency of more than 100%.

Such results show that the problems of conventional $Li_2MO_3/LiMeO_2$ composites, such as high initial irreversible capacity and low coulombic efficiency, can be overcome by using a spinel structure in the active material.

Cathode active materials according to certain embodiments of the present invention have layered-spinel composite structures in which lithium can be intercalated and deintercalated. Therefore, lithium batteries including the cathode active materials have high initial coulombic efficiencies and high capacity retention ratios.

While the present invention has been illustrated and described with reference to certain exemplary embodiments, it will be understood by those of ordinary skill in the art that various modifications and changes may be made to the described embodiments without departing from the spirit and scope of the present invention as defined by the following claims.

What is claimed is:

1. A cathode active material comprising a composite lithium metal oxide represented by Formula 1:

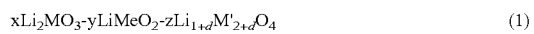

$$xLi_2MO_3\text{-}yLiMeO_2\text{-}zLi_{1+d}M'_{2+d}O_4 \quad (1)$$

wherein:

$0 \leq d \leq 0.33$;

$0<x<1$, $0<y<1$, $0.01 \leq z<1$ and $x+y+z=1$;

M is selected from the group consisting of Mn, Ti, and combinations thereof;

Me is selected from the group consisting of Ti, V, Cr, Mn, Fe, Co, Ni, Cu, Al, Mg, Zr, B and combinations thereof; and M' is selected from the group consisting of Ti, V, Cr, Mn, Fe, Co, Ni, Cu, Al, Mg, Zr, B and combinations thereof.

2. The cathode active material of claim 1, wherein the $Li_{1+d}M'_{2-d}O_4$ has a spinel structure.

3. The cathode active material of claim 1, wherein the $Li_2MO_3$—$LiMeO_2$ has a layered structure.

4. The cathode active material of claim 1, wherein $0<x<0.7$.

5. The cathode active material of claim 1, wherein $0.3<y<1$.

6. The cathode active material of claim 1, wherein $0.01 \leq z<0.3$.

7. The cathode active material of claim 1, wherein the lithium metal oxide represented by Formula 1 is represented by Formula 2:

$$xLi_2MO_3\text{-}yLiMeO_2\text{-}zLi_{1+d}M'_{2-d}O_4 \qquad (2)$$

wherein:
  $0<x<0.7$, $0.3<y<1$, $0.01 \leq z<0.3$ and $x+y+z=1$;
  $0<d \leq 0.33$;
  each of M and M' is Mn; and
  Me is selected from the group consisting of Ti, V, Cr, Mn, Fe, Co, Ni, Cu, Al, Mg, Zr, B and combinations thereof.

8. The cathode active material of claim 7, wherein the $Li_{1+d}M'_{2-d}O_4$ has a spinel structure.

9. The cathode active material of claim 1, wherein the lithium metal compound represented by Formula 1 is represented by:

$$0.5Li[Li_{1/3}Mn_{2/3}]O_2\text{-}0.3LiCoO_2\text{-}0.2Li_{4/6}Mn_{5/6}O_2$$

10. The cathode active material of claim 9, wherein the $LiMn_2O_4$ has a spinel structure.

11. The cathode active material of claim 1, wherein when the cathode active material is included in a lithium battery comprising a lithium metal counter electrode, upon charging/discharging the lithium battery, oxidation/reduction peaks of Mn existing in the spinel structure appears in a range of from about 2.0V to about 3.0V on a plot of voltage versus charge/discharge capacity.

12. A cathode comprising the cathode active material of claim 1.

13. The cathode of claim 12, wherein the lithium metal oxide represented by Formula 1 is represented by Formula 2:

$$xLi_2MO_3\text{-}yLiMeO_2\text{-}zLi_{1+d}M'_{2-d}O_4 \qquad (2)$$

wherein:
  $0<x<0.7$, $0.3<y<1$, $0.01 \leq z<0.3$ and $x+y+z=1$;
  $0 \leq d \leq 0.33$;
  each of M and M' is Mn; and
  Me is selected from the group consisting of Ti, V, Cr, Mn, Fe, Co, Ni, Cu, Al, Mg, Zr, B and combinations thereof.

14. The cathode of claim 12, wherein the lithium metal compound represented by Formula 1 is represented by:

$$0.5Li[Li_{1/3}Mn_{2/3}]O_2\text{-}0.3LiCoO_2\text{-}0.2Li_{4/6}Mn_{5/6}O_2$$

15. A lithium battery comprising the cathode of claim 12.

16. The lithium battery of claim 15, wherein the lithium metal oxide represented by Formula 1 is represented by Formula 2:

$$xLi_2MO_3\text{-}yLiMeO_2\text{-}zLi_{1+d}M'_{2-d}O_4 \qquad (2)$$

wherein:
  $0<x<0.7$, $0.3<y<1$, $0.01 \leq z<0.3$ and $x+y+z=1$;
  $0 \leq d \leq 0.33$;
  each of M and M' is Mn; and
  Me is selected from the group consisting of Ti, V, Cr, Mn, Fe, Co, Ni, Cu, Al, Mg, Zr, B and combinations thereof.

17. The lithium battery of claim 15, wherein the lithium metal compound represented by Formula 1 is represented by:

$$0.5Li[Li_{1/3}Mn_{2/3}]O_2\text{-}0.3LiCoO_2\text{-}0.2Li_{4/6}Mn_{5/6}O_2$$

* * * * *

UNITED STATES PATENT AND TRADEMARK OFFICE
CERTIFICATE OF CORRECTION

| | | |
|---|---|---|
| PATENT NO. | : 7,927,506 B2 | Page 1 of 3 |
| APPLICATION NO. | : 11/859700 | |
| DATED | : April 19, 2011 | |
| INVENTOR(S) | : Kyu-sung Park | |

It is certified that error appears in the above-identified patent and that said Letters Patent is hereby corrected as shown below:

On the Title Page

(56) References Cited          Delete "al, Lithium-manganese"
Other Publications,            Insert -- al, "Lithium-manganese --
right column, line 8.

(56) References Cited          Delete "batteries,"
Other Publications,            Insert -- batteries," --
right column, line 10.

(57) Abstract, line 2.         Delete "layered-spine"
                               Insert -- layered-spinel --

In the Drawings

Sheet 4 of 7, FIG. 3           Delete Drawing Sheet 4 and substitute
                               therefore the Drawing Sheet, consisting of
                               FIG. 3, as shown on the attached page.

Delete "EFFICIRNCY"
                               Insert -- EFFICIENCY --

Column 10, Claim 1, line 52.   Delete "M'$_{2+d}$"
                               Insert -- M'$_{2-d}$ --

Signed and Sealed this
Thirtieth Day of October, 2012

David J. Kappos
*Director of the United States Patent and Trademark Office*

CERTIFICATE OF CORRECTION (continued)
U.S. Pat. No. 7,927,506 B2

Column 10, Claim 1, line 55.    Delete "$0 \leqq d$"

Insert -- $0 < d$ --

Column 12, Claim 13, line 5.    Delete "$M'_{2+d}$"

Insert -- $M'_{2-d}$ --

Column 12, Claim 13, line 8.    Delete "$0 \leqq d$"

Insert -- $0 < d$ --

Column 12, Claim 16, line 25.    Delete "$0 \leqq d$"

Insert -- $0 < d$ --

UNITED STATES PATENT AND TRADEMARK OFFICE
CERTIFICATE OF CORRECTION

PATENT NO. : 7,927,506 B2  
APPLICATION NO. : 11/859700  
DATED : April 19, 2011  
INVENTOR(S) : Kyu-sung Park Page 1 of 3

It is certified that error appears in the above-identified patent and that said Letters Patent is hereby corrected as shown below:

On the Title Page

(56) References Cited Other Publications, right column, line 8.

Delete "al, Lithium-manganese"

Insert -- al, "Lithium-manganese --

(56) References Cited Other Publications, right column, line 10.

Delete "batteries,"

Insert -- batteries," --

(57) Abstract, line 2.

Delete "layered-spine"

Insert -- layered-spinel --

In the Drawings

Sheet 4 of 7, FIG. 3

Delete Drawing Sheet 4 and substitute therefore the Drawing Sheet, consisting of FIG. 3, as shown on the attached page.

Delete "EFFICIRNCY"

Insert -- EFFICIENCY --

This certificate supersedes the Certificate of Correction issued October 30, 2012.

Signed and Sealed this  
Fifteenth Day of October, 2013

Teresa Stanek Rea  
*Deputy Director of the United States Patent and Trademark Office*

CERTIFICATE OF CORRECTION (continued)
U.S. Pat. No. 7,927,506 B2

In the Claims:

| | |
|---|---|
| Column 10, Claim 1, line 52. | Delete "$M'_{2+d}$" |
| | Insert -- $M'_{2-d}$ -- |
| Column 10, Claim 1, line 55. | Delete "$0 \leqq d$" |
| | Insert -- $0 < d$ -- |
| Column 12, Claim 13, line 5. | Delete "$M'_{2+d}$" |
| | Insert -- $M'_{2-d}$ -- |
| Column 12, Claim 13, line 8. | Delete "$0 \leqq d$" |
| | Insert -- $0 < d$ -- |
| Column 12, Claim 16, line 25. | Delete "$0 \leqq d$" |
| | Insert -- $0 < d$ -- |